United States Patent [19]
Özveren

[11] Patent Number: 5,432,788
[45] Date of Patent: Jul. 11, 1995

[54] SCHEDULING METHOD FOR A SLOTTED COMMUNICATION MEDIUM WITH MULTIPLE BUT LIMITED NUMBER OF CARRIERS AND INDEPENDENT RECEIVER/TRANSMITTER PAIRS

[75] Inventor: Cüneyt M. Özveren, Somerville, Mass.

[73] Assignee: Digital Equipment Corporation, Maynard, Mass.

[21] Appl. No.: 204,690

[22] Filed: Mar. 2, 1994

[51] Int. Cl.$^6$ ................................................. H04J 3/16
[52] U.S. Cl. ..................................... 370/85.7; 370/951
[58] Field of Search ................ 370/85.7, 85.8, 85.1, 370/91, 95.1, 95.2, 95.3, 58.1, 60, 66, 67, 68

[56] References Cited

U.S. PATENT DOCUMENTS

| | | | |
|---|---|---|---|
| 4,394,541 | 7/1983 | Seiden ............................. | 179/18 GE |
| 4,809,270 | 2/1989 | Baxter et al. ...................... | 370/85.7 |
| 5,276,682 | 1/1994 | Van As et al. ..................... | 370/85.7 |

OTHER PUBLICATIONS

Anderson, et al, "High Speed Switch Scheduling for Local Area Networks"-Digital Equipment Corporation Systems Research Center, pp. 1–13, International Conference on Architectural Support for Programming Languages and Operating Systems-ASPLOS v 27 n 9 Sep. 1992, Published by ACM, New York, N.Y., U.S.A., Publication Year: 1992.
Paull, "Reswitching of Connection Networks,"–The Bell System Technical Journal, May 1962, pp. 833–855.

*Primary Examiner*—Douglas W. Olms
*Assistant Examiner*—Huy D. Vu
*Attorney, Agent, or Firm*—Kenneth F. Kozik

[57] ABSTRACT

A method of scheduling a conversation between a designated transmitter adapter card and a designated receiver adapter card, comprising the steps of selecting a first slot having a free channel, selecting a second slot having the designated transmitter adapter card free, selecting a third slot having the designated receiver adapter card free, assigning a connection between the designated transmitter adapter card and the designated receiver adapter card in the free channel in the first slot, resolving any conflict between the designated transmitter adapter card and any other conversation by swapping conversations between the first slot and the second slot, resolving any conflict between the designated receiver adapter card and any other conversation by swapping conversations between the first slot and the third slot.

16 Claims, 4 Drawing Sheets

SCHEDULING METHOD FOR A SLOTTED COMMUNICATION MEDIUM WITH MULTIPLE BUT LIMITED NUMBER OF CARRIERS AND INDEPENDENT RECEIVER/TRANSMITTER PAIRS

FIELD OF THE INVENTION

This invention relates to local area network (LAN) based communications networks, and more particularly to a method of scheduling the full capacity of a slotted communications medium with a limited number of channels in each slot.

BACKGROUND OF THE INVENTION

In high performance distributed computing, a network must have high throughput, low latency, and graceful degradation under heavy workloads. In addition, high performance distributed computing must have the ability to provide guaranteed performance to real-time applications, and performance that is both fair and predictable. A barrier to building high performance networks is the difficulty of high speed switching—of taking data arriving on an input link and quickly sending it out an appropriate output link. The switching task is simplified if the data can be processed in fixed length cells.

Many high speed switch architectures use the same hardware for both scheduling and forwarding. If the input and output links of a switch are connected internally by a multi-stage interconnection network, the internal network can detect and resolve conflicts between cells as they work their way through the switch.

As is also well known in the art, current methods to schedule conversation requests to an open channel work fine with any implementation of a slotted network medium as long as there are n channels and n users. A slotted communications medium is a synchronous medium that is logically divided into time frames. Each time frame is further divided into a fixed number of slots, and each slot contains a fixed number of channels. Where the number of users and the number of channels are equal, no problem usually exists; designers will use scheduling methods well known in the art, such as the Slepian-Duguid method. However, a scheduling method is needed when the number of users exceeds the number of channels on a slotted medium, and where, in a frame, (1) a first slot with a transmitter portion of a transmitter-receiver pair is free, and (2) a second slot with a receiver portion of the transmitter-receiver pair is free, and (3) a free channel is free in a third slot.

SUMMARY OF THE INVENTION

In accordance with the present invention, a method of scheduling is provided having the steps of providing a bus for interconnection of a plurality of devices, the bus synchronized by a clock line, the bus comprised of a plurality of frames, each of the frames having a plurality of slots, the slots having a plurality of channels, providing a first transmitter-receiver pair to the bus to be scheduled, searching the plurality of slots within a first frame to find a first slot with a transmitter portion of the first transmitter-receiver pair free in the first frame, a second slot with a receiver portion of the first transceiver portion of the first transmitter-receiver pair free in the first frame, and a third slot with a free channel in the first frame, scheduling the first transmitter-receiver pair in the third slot with the free channel, determining whether a conflict exists between the transmitter portion of the first transmitter-receiver pair and a transmitter portion of a second transmitter-receiver pair executing in the slot with the free channel, resolving the conflict between the first transmitter-receiver pair and the second transmitter-receiver pair if the determining step determines the conflict to exist, determining whether a conflict exists between a receiver portion of the first transmitter-receiver pair conflicts and a transmitter portion of a third transmitter-receiver pair executing in the slot with the free channel, resolving the conflict between the first transmitter-receiver pair and the third transmitter-receiver pair if the determining step determines the conflict to exist, and scheduling the first transmitter-receiver pair in the free channel.

The method further provides a means of resolving transmitter conflict by selecting a transmitter-receiver pair in the first slot which has not been marked as previously moved such that the receiver portion of the selected transmitter-receiver does conflict with any of the receiver portions of the plurality of transmitter-receiver pair executing in the slot with the free channel, scheduling the selected unmarked transmitter-receiver pair in the slot with the free channel, marking the selected transmitter-receiver pair as having been moved, assigning the vacant channel of the selected transmitter-receiver pair to the third transmitter-receiver pair, determining whether a transmitter portion of the selected transmitter-receiver pair conflicts with any of the transmitter portions of the plurality of transmitter-receiver pairs in the slot with the free channel, and repeating the steps selecting, scheduling, marking, assigning, and determining until there is no conflict of executing transmitter-receiver pairs in the slot with the free channel. The method invention further provides a means of resolving receiver conflict in a similar fashion. Such an arrangement allows the full utilization of the capacity of of a slotted medium with a limited number of channels in each slot.

BRIEF DESCRIPTION OF THE DRAWINGS

The novel features believed characteristic of the invention are set forth in the appended claims. The invention itself, however, as well as features and advantages thereof, will be best understood by reference to the detailed description of specific embodiments which follows, when read in conjunction with the accompanying drawings, wherein:

DETAILED DESCRIPTION

Figure 1:
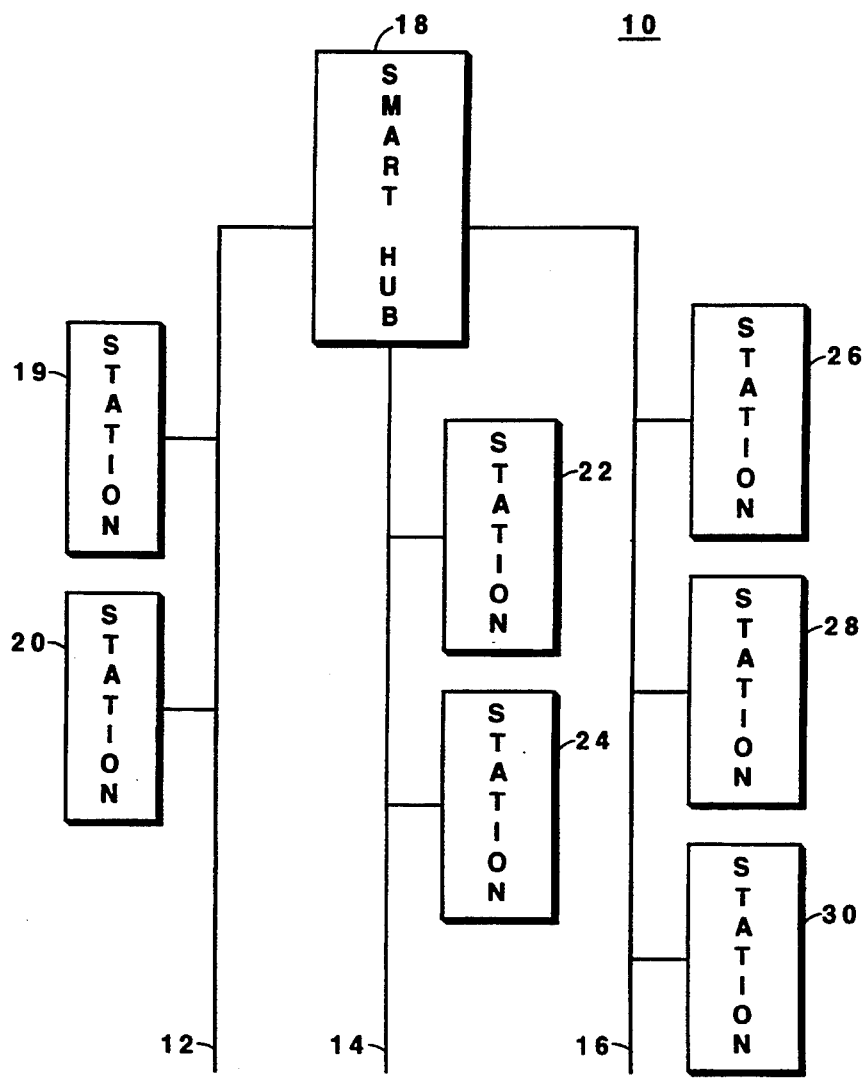
FIG. 1 is a block diagram representing a distributed local area network (LAN)

Referring to FIG. 1, an exemplary network 10 is shown as having three local area networks (LANs)

labelled as 12, 14, and 16. The LANs 12, 14, and 16 are further shown to be connected to each other via a smarthub 18. Furthermore, the LAN 12 is shown as containing station 19 and station 20; LAN 14 is shown as having station 22 and station 24; LAN 26 is shown as having station 26, station 28, and station 30. Information transfer between one LAN 12 to another LAN 14 flows through smarthub 18.

Figure 2:
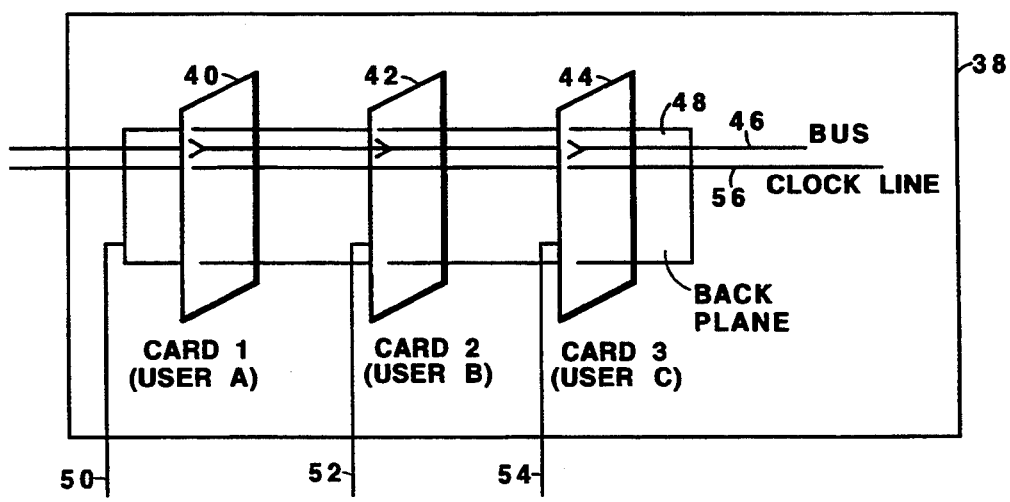
FIG. 2 is a block diagram showing a hub.

Referring to FIG. 2, an exemplary smarthub 38 is shown to include three cards, 40, 42, and 44. Each card provides a connection of a LAN to a bus 46 on a backplane 48. For example, LAN 50 is connected to smarthub 38 via card 40. LAN 52 is connected to smarthub 38 via card 42. LAN 54 is connected to smarthub 38 via card 44. When a device (not shown) on LAN 50 needs to pass information to some other device (not shown) on LAN 54, the data is transferred from LAN 50 through card 40, placed on the bus 46, and received through card 48 to LAN 54. Synchronization of the data placed on bus 46 is provided by a clock line 56 which is part of the backplane 48.

Data is transmitted to the bus 46 is passed to a frame and scheduled in a channel with the frame.

Figure 3:
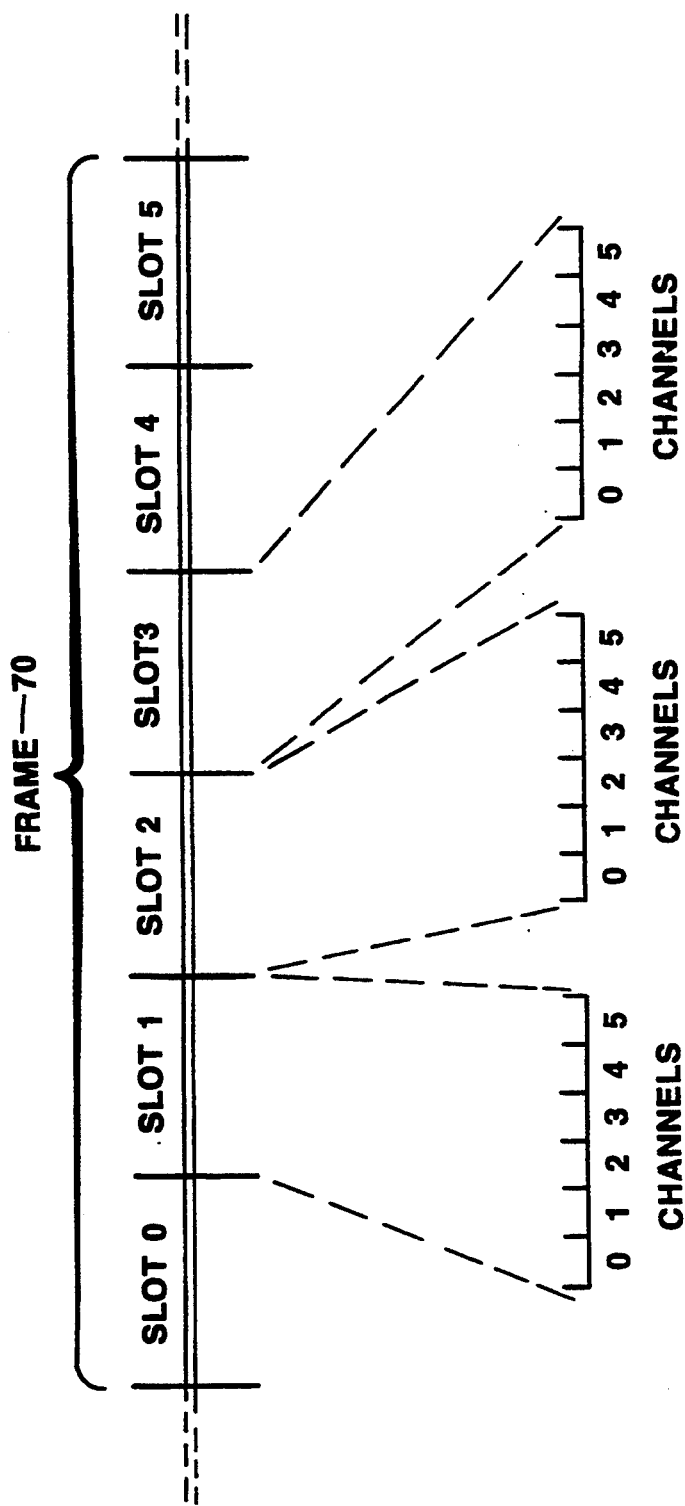
FIG. 3 is a block diagram showing a slotted communications medium representing the hub of FIG. 2.

Referring to FIG. 3, an exemplary frame 70 is shown as having a number of slots. Each of the slots is further shown as having a number of channels. When a transmitting device passes data to a receiving device a conversation must be scheduled in the frame. The conversation consists of a transmitting device which is sending data and a receiving device which will receive the data. Each conversation is also referred to as a unique transmitter-receiver pair. For example, if the card 40 of FIG. 2 wishes to pass data to the card 42 of FIG. 2, a conversation will be scheduled in some channel of some slot in frame 70. More specifically, a conversation 40,42 will need to be scheduled in channel 0 of slot 2, for example. The example conversation 40,42 represents card 40 of FIG. 2 as a transmitter, and card 42 of FIG. 2 as a receiver.

Figure 4:
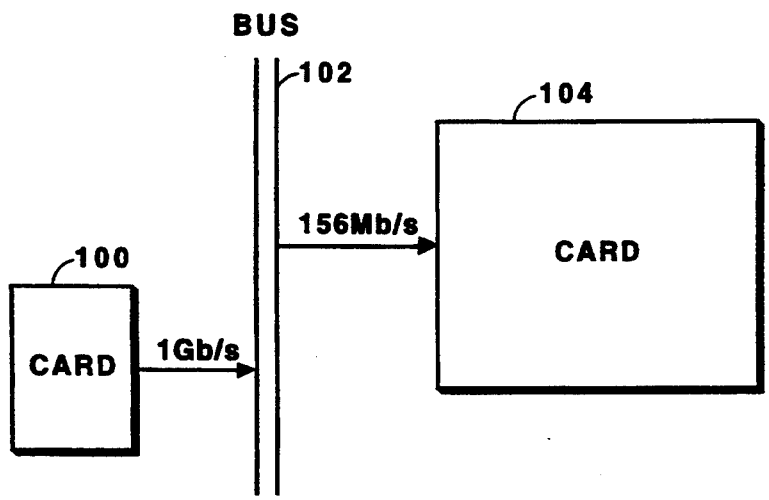
FIG. 4 is a block diagram showing the timing constraints of the hub.
Figure 5:
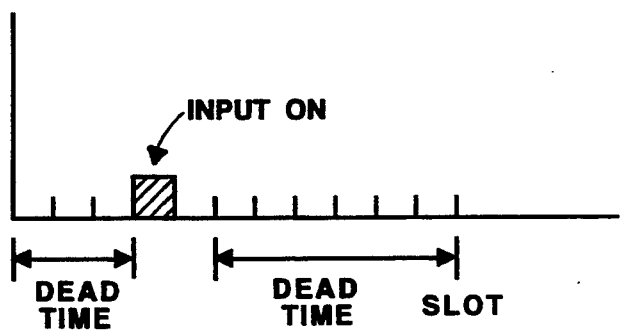
FIG. 5 is a block diagram showing the imposition of dead time in the hub.

The scheduling of any conversation in a channel of a slot of a frame is further limited by the fact that no conflicting transmitter cards or receiver cards may be scheduled in more than one channel of the same slot. That is, a card may transmit only one conversation to the bus during a slot, and a card may receive only one conversation from the bus during a slot. For example, a conversation 40,42 may not be scheduled in slot 2 if some other conversation 44,42 is currently scheduled in the same slot. The reason for this may be explained by referring to FIGS. 4 and 5. FIG. 4 illustrates that the local area network (LAN) can deliver data and receive data from the bus at a much smaller rate, say at one tenth of the bus rate. A typical bus data rate is 1 Gigabit per second, while a typical LAN receive or transmit rate is 156 Megabits per second. Thus, the bus 102 may provide data at a high rate of speed and the card 100 may only transfer data to the LAN at a much smaller rate. Furthermore, card 104 may only receive data from the LAN at this same smaller rate.

A dead time is imposed in each slot on data transfer between a card and the bus so that the average data transfer during a slot between a card and the high speed bus has an average rate that does not exceed the slower transfer rate between the LAN and the card. Thus, when data is received or transmitted with a channel a dead time, it is insured that the average transfer rate to the bus will not exceed the average transfer rate of the LAN. If two transmissions were made between the card and the high speed bus during any one slot time, then the transmission would lose data or additional expensive buffer would need to be placed between the LAN and the bus.

If the number of cards or devices connected to the smarthub is equal to or less than the total number of channels, a specific conversation in which no transmitter-receiving conflict arises will be insured. This illustrated in FIG. 6.

Figure 6:
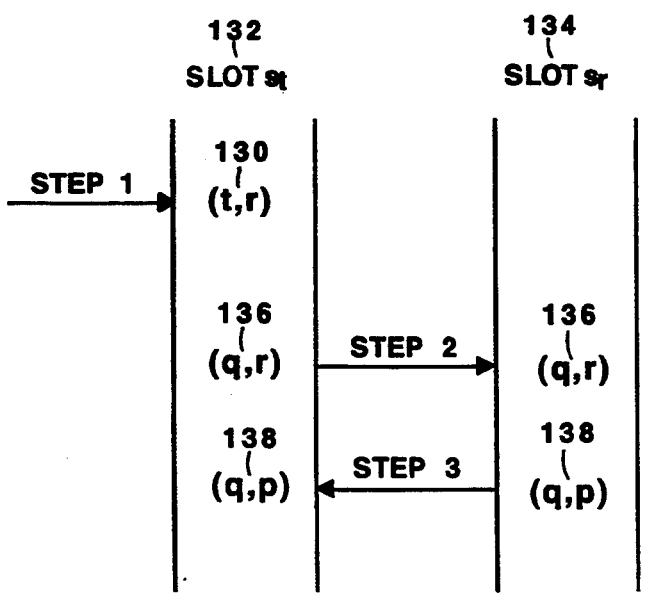
FIG. 6 is a block diagram showing a scheduling method for guaranteed bandwidth traffic.

Referring now to FIG. 6, a conversation request may be represented by a transmitter-receiver pair (t,r) 130. The transmitter-receiver pair (t,r) 130 can be scheduled if there exists some slot, $s_t$ 132 for example, where the transmitter of the request is free, and some slot, $s_r$ 134 for example, where the receiver is free. The transmitter-receiver pair (t,r) 130 is scheduled in the following manner. A slot, $s_t$ 132 for example, is chosen. The new request represented by (t,r) 130 is scheduled in slot $s_t$ 132. Since the method assumes n channels, a free channel will be found. However, as seen in FIG. 6, the request conversation (t,r) 130 conflicts with an existing conversation (q,r) 136 in slot $s_t$ 132. Since transmitter is free in slot $s_r$ 134, conversation (q, r) 136 is scheduled in slot $s_r$ 134. However, when conversation (q,r) 136 is scheduled in slot $s_r$ 134 it may conflict with an existing conversation (q,p) 138, for example. Therefore, since conversation (q,r) 136 was removed from slot $s_t$ 132, transmitter q is free in slot $s_t$ 132. Thus, conversation (q,p) 138 is scheduled in slot $s_t$ 132. This process of scheduling conversations, checking for conflicting conversations, and moving conversations to different slots is repeated and will terminate in at most in n steps, since a given conversation is never moved more than once.

The preceding implementation works well as long as there are n channels. However, when the number of conversations exceeds the number of available channels, the method will fail.

Figure 7:
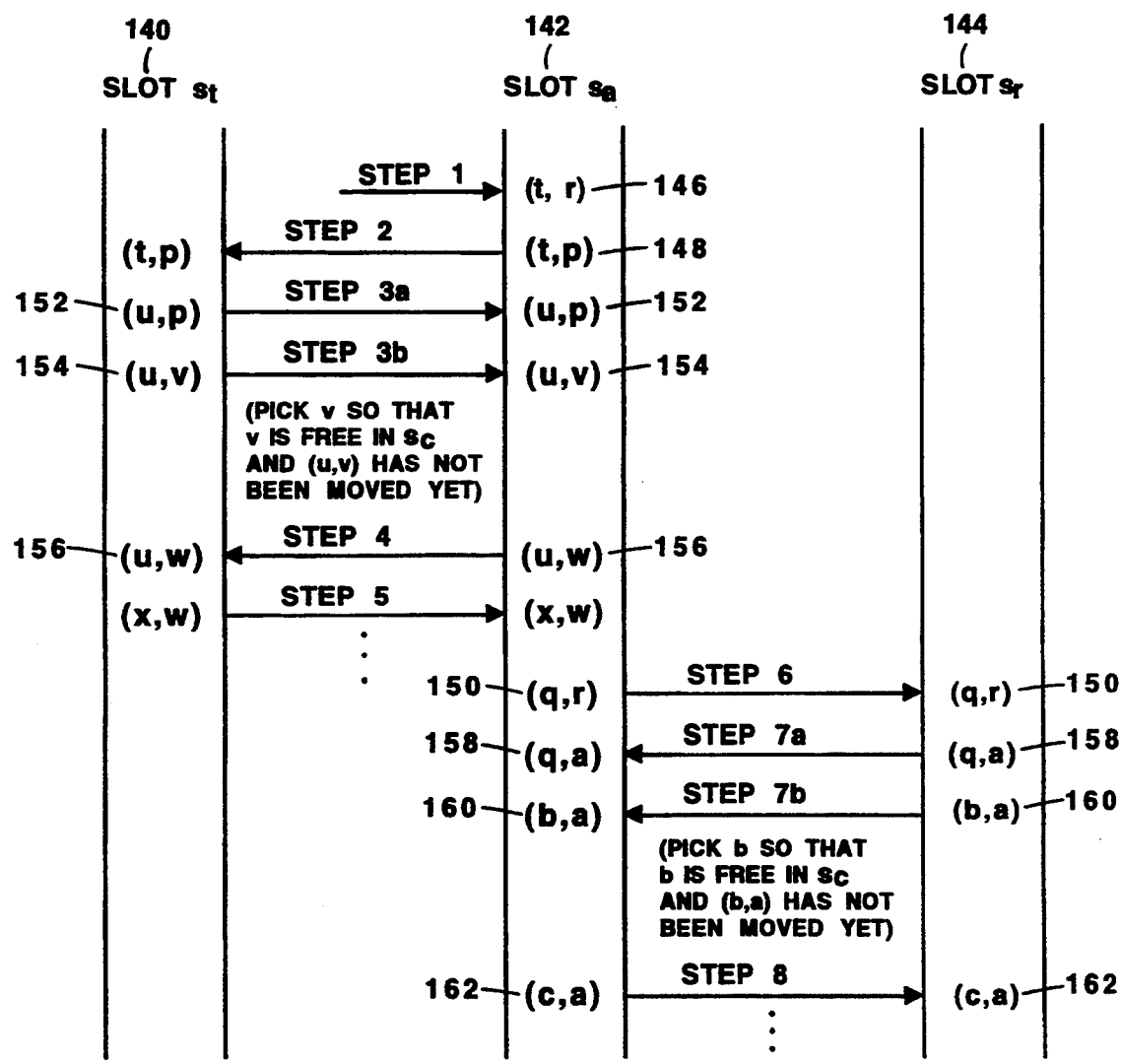
FIG. 7 is a block diagram showing a scheduling method for slotted communications medium with a limited number of channels in accordance with the present invention.

Referring to FIG. 7, in accordance with the present invention, a slotted medium having three slots $s_t$ 140, $s_c$ 142, and $s_r$ 144 is shown. A new conversation request is represented by the transmitter-receiver pair (t,r) 146. The new conversation request (t,r) 146 is scheduled in slot $s_c$ 142. The scheduling of conversation (t,r) 146 in slot $s_c$ 142 may conflict with existing conversation (t,p) 148 and conversation (q,r) 150 in slot $s_c$ 142. Since there are two potential conflicting conversations in slot $s_c$ 142, i.e., conversation (t,r) 146 with conversation (t,p) 148 and conversation (t,r) 146 with conversation (q,r) 150, each is handled separately.

The assumption is that the channels in both slot $s_t$ and slot $s_r$ are used in full. Thus, initially a channel must be found in slot $s_t$ 140 to transmit conversation (t,p) 148. Two possibilities exist. First, if there exists a conversation (u,p) 152 already scheduled in slot $s_t$ 140, conversation (u,p) 152 is then scheduled in slot $s_c$ 142 and conversation (u,p)'s 152 channel in slot $s_t$ is used to transmit conversation (t,p) 148.

On the other hand, if both transmitter t and receiver p are free in slot $s_t$, some conversation is required to be moved to slot $s_c$ 142 so that conversation (t,p) 148 has use of its channel. In this case, a conversation (u,v) 154 in slot $s_t$ may be chosen which has not been moved previously, such that receiver v is free in slot $s_c$ 142. This may be done because the number of conversations in slot $s_t$ 140 that were moved equals those in slot $s_c$ 142 with one to one correspondence between the transmitters in a transmitter-receiver conversation, and the total number of conversations in slot $s_t$ 140 is one more than the total number of conversations in slot $s_c$ 142. Thus, (u,v) 154 is moved to free a channel in slot $s_c$ while assigning its channel in slot $s_t$ 140 to conversation (t,p) 148.

However, the move of conversation (u,v) 154 to slot $s_c$ 142 may conflict with an existing conversation (u,w) 156 in slot $s_c$ 142. In this case, conversation (u,w) 156 would be moved to slot $s_t$ 140, as described above. It may all be possible that conversation (u,w) 156 is the same as conversation (q,r) 150, the second pair conflicting with conversation (t,r) 146. If this conflict occurs, conversation (q,r) 150 is moved to slot $s_t$ as usual. If it does not conflict with any transmitter-receiver pair in slot $s_c$, no second part of this method is required. However, if it conflicts with some conversation (x,r), not shown, which is moved back to slot $s_c$ 142, the conflict between conversation (x,r) and conversation (t,r) 146 is ignored, and conversation (q,r) 150 is replaced by conversation (x,r) and the process continued. In other words, the process acts as if conversation (t,r) 146 has not been scheduled yet, and the process is just trying to create a space for it.

A move of conversation (u, w) 156 to slot $s_t$ 144 may either conflict with an existing conversation in slot $s_t$ or a channel may need to be freed by choosing another conversation, as shown above. The overall process is continued until the conversation which is moved to slot $s_c$ 142 no longer conflicts with a conversation in slot $s_c$ 142.

As mentioned above, the process may terminate at this point if there were no transmitter-receiver pairs (i.e., conversations) conflicting receiver r. However, if there is such a pair, then it is moved to slot $s_r$ 144, and the second phase of the process is begun, which is the same as the first phase of the process, except that the transmitters and the transceivers shift roles.

If there is a free channel in slot $s_c$ 142, then the overall process will terminate whenever moving a conversation no longer contradicts an existing one. If it is assumed that all channels in slot $s_c$ 142 are full there exists two possibilities. First, if there exists a conversation (q,a) 158 already scheduled in slot $s_r$ 144, conversation (q,a) 158 is moved to slot $s_c$ 142 and its channel is used for conversation (q,a) 158.

On the other hand, if both transmitter q and receiver r are free in slot $s_r$ 144, any conversation, conversation (b,a) 160 for example, in slot $s_r$ is picked such that transmitter b in conversation (b,a) 160 is free in slot $s_c$ 142. The only requirement is that conversation (b,a) 160 cannot have been moved before. Conversation (b,a) 160 is moved to the free channel in slot $s_c$ 142, while assigning its channel in slot $s_r$ 144 to conversation (q,r) 150.

Moving conversation (b,a) 160 may conflict an existing conversation (c,a) 162 in slot $s_r$ 144. In this case, the process moves conversation (c,a) 162 to slot $s_r$ and continues repeating itself until the conversation moved to slot $s_c$ 142 no longer conflicts a conversation in slot $s_c$. The repetitive process will terminate in n steps since no conversation is ever moved more than once. Upon termination of the overall process, conversation (t,r) 146 has successfully been scheduled.

Having described a preferred embodiment of the invention, it will now become apparent to those skilled in the art that other embodiments incorporating its concepts may be provided. It is felt therefore, that this invention should not be limited to the disclosed invention, but should be limited only by the spirit and scope of the appended claims.

What is claimed is:

1. A method of scheduling comprising the steps of:
   providing a bus for interconnection of a plurality of devices, said bus synchronized by a clock line;
   said bus transmitting a plurality of frames, each of said frames having a plurality of slots, said slots having a plurality of channels, said plurality of channels having a plurality of transmitter-receiver pairs executing therein;
   providing a first transmitter-receiver pair to the bus to be scheduled;
   searching the plurality of slots within a first frame to find a first slot with a transmitter portion of the first transmitter-receiver pair free in the first frame, a second slot with a receiver portion of the first transceiver portion of the first transmitter-receiver pair free in the first frame, and a third slot with a free channel in the first frame;
   aborting the scheduling of the first transmitter-receiver pair if the step of searching fails to locate the first slot with the transmitter portion of the transmitter-receiver pair free in the first frame;
   aborting the scheduling of the first transmitter-receiver pair if the step of searching fails to locate the second slot with the receiver portion of the transmitter-receiver pair free in the first frame;
   aborting the scheduling of the first transmitter-receiver pair if the step of searching fails to locate the third slot with a free channel in the first frame;
   scheduling the first transmitter-receiver pair in the third slot with the free channel;
   determining whether a conflict exists between the transmitter portion of the first transmitter-receiver pair and a transmitter portion of a second transmitter-receiver pair executing in the third slot with the free channel;
   resolving the conflict between the first transmitter-receiver pair and the second transmitter-receiver pair if the determining step determines the conflict to exist;
   determining whether a conflict exists between a receiver portion of the first transmitter-receiver pair conflicts and a transmitter portion of a third transmitter-receiver pair executing in the third slot with the free channel; and
   resolving the conflict between the first transmitter-receiver pair and the third transmitter-receiver pair if the determining step determines the conflict to exist; and
   scheduling the first transmitter-receiver pair in the free channel.

2. The method of scheduling a plurality of transmitter-receiver pairs in a communication system according to claim 1 wherein the step of resolving the conflict between the first transmitter-receiver pair and the second transmitter-receiver pair comprises the step of:
   scheduling the second transmitter-receiver pair out of the third slot and into the first slot.

3. The method of scheduling a plurality of transmitter-receiver pairs in a communication system according to claim 2 wherein the step of scheduling the second transmitter-receiver pair into the first slot further comprises the steps of:
   selecting a transmitter-receiver pair executing in the first slot whose receiver portion conflicts with the receiver portion of the second transmitter-receiver pair; and scheduling the selected transmitter-receiver pair out of the first slot and into the slot with the free channel.

4. The method of scheduling a plurality of transmitter-receiver pairs in a communication system according to claim 2 wherein the step of scheduling the second transmitter-receiver pair into the first slot further comprises the steps of:
searching in the first slot for a third transmitter-receiver pair to move out of the first slot and into the slot with the free channel; and
scheduling the second transmitter-receiver pair in a channel vacated by the third transmitter-receiver pair in the first slot.

5. The method of scheduling a plurality of transmitter-receiver pairs in a communication system according to claim 4 wherein the step of searching in the first slot for a third transmitter pair further comprises the steps of:
selecting a transmitter-receiver pair in the first slot which has not been marked as previously moved such that the receiver portion of the selected transmitter-receiver does conflict with any of the receiver portions of the plurality of transmitter-receiver pair executing in the slot with the free channel;
scheduling the selected unmarked transmitter-receiver pair in the slot with the free channel;
marking the selected transmitter-receiver pair as having been moved;
assigning the vacant channel of the selected transmitter-receiver pair to the third transmitter-receiver pair;
determining whether a transmitter portion of the selected transmitter-receiver pair conflicts with any of the transmitter portions of the plurality of transmitter-receiver pairs in the slot with the free channel; and
repeating the steps selecting, scheduling, marking, assigning, and determining until there is no conflict of executing transmitter-receiver pairs in the slot with the free channel.

6. The method of scheduling a plurality of transmitter-receiver pairs in a communication system according to claim 1 wherein the step of resolving the conflict between the first transmitter-receiver pair and the third transmitter-receiver pair comprises the steps of:
searching the plurality of slots to find a second slot where a receiver portion of a fourth transmitter-receiver pair is free;
scheduling the fourth transmitter-receiver pair out of the free channel and into the second slot.

7. The method of scheduling a plurality of transmitter-receiver pairs in a communication system according to claim 2 wherein the step of scheduling a fourth transmitter-receiver pair into the second slot further comprises the steps of:
selecting a transmitter-receiver pair executing in the second slot whose transmitter portion conflicts with the transmitter portion of the fourth transmitter-receiver pair; and
scheduling the selected transmitter-receiver pair out of the second slot and into the slot with the free channel.

8. The method of scheduling a plurality of transmitter-receiver pairs in a communication system according to claim 6 wherein the step of scheduling the fourth transmitter-receiver pair into the second slot further comprises the steps of:
searching in the second slot for a fifth transmitter-receiver pair to move out of the second slot and into the slot with the free channel; and
scheduling the fourth transmitter-receiver pair in a channel vacated by the fifth transmitter-receiver pair in the second slot.

9. The method of scheduling a plurality of transmitter-receiver pairs in a communication system according to claim 8 wherein the step of searching in the second slot for a fifth transmitter pair further comprises the steps of:
selecting a transmitter-receiver pair in the second slot which has not been marked as previously moved such that the transmitter portion of the selected transmitter-receiver does conflict with any of the transmitter portions of the plurality of transmitter-receiver pair executing in the slot with the free channel;
scheduling the selected unmarked transmitter-receiver pair in the slot with the free channel;
marking the selected transmitter-receiver pair as having been moved;
assigning the vacant channel of the selected transmitter-receiver pair to the fifth transmitter-receiver pair;
determining whether a receiver portion of the selected transmitter-receiver pair conflicts with any of the receiver portions of the plurality of transmitter-receiver pairs in the slot with the free channel; and
repeating the steps selecting, scheduling, marking, assigning, and determining until there is no conflict of executing transmitter-receiver pairs in the slot with the free channel.

10. In a hub having a plurality of adapter cards, each adapter card connected to a LAN and connected to a backplane bus, the backplane bus operated as a slotted medium by synchronously providing time frames, the frames divided into slots where the bandwidth assigned to a slot substantially equals the bandwidth of the backplane bus, and the slots are divided into channels so that the bandwidth assigned to all channels in a slot substantially adds to equal the bandwidth of the bus, an adapter card permitted to have a conversation to said backplane bus during only one channel of a slot and an attempted to schedule two conversations between said backplane bus and an adapter card during one slot is referred to as a conflict, a method of scheduling a conversation between a designated transmitter adapter card and a designated adapter card, comprising the steps of:
selecting a first slot having a free channel;
aborting the scheduling of the conversation if the first slot does not contain a free channel;
selecting a second slot having said designated transmitter adapter card free;
aborting the scheduling of the conversation if the second slot fails to ahve the designated transmitter adapter card free;
selecting a third slot having said designated receiver adapter card free;
aborting the scheduling of the conversation if the third slot fails to have the designated receiver adapter card free;
assigning a connection between said designated transmitter adapter card and said designated receiver adapter card in said free channel in said first slot;

resolving any conflict between said designated transmitter adapter card and any other conversation executing within said first slot by swapping conflicting conversations between said first slot and said second slot;

resolving any conflict between said designated receiver adapter card and any other conversation executing within said first slot by swapping conflicting conversations between said first slot and said third slot.

11. The method of scheduling according to claim 10 wherein the step of resolving any conflict between said designated transmitter adapter card and any other conversation by swapping conversations between said first slot and said second slot comprises the steps of:

scheduling a conflicting conversation pair out of the first slot and into the second slot.

12. The method of scheduling according to claim 11 wherein the step of scheduling the conflicting conversation into the second slot further comprises the steps of:

searching in the second slot for a second slot conversation to move out of the second slot and into the first slot with the free channel; and scheduling the second slot conversation in a channel vacated by the conflicting conversation in the first slot.

13. The method of scheduling according to claim 12 wherein the step of searching in the second slot for the second slot conversation comprises the steps of:

selecting a conversation in the second slot which has not been marked as previously moved such that the receiver portion of the selected conversation does conflict with any of the receiver portions of the plurality of conversations executing in the first slot;

scheduling the selected unmarked conversation in the first slot;

marking the selected unmarked conversation as having been moved;

assigning the vacant channel of the selected conversation to the second slot conversation;

determining whether a transmitter portion of the selected conversation conflicts with any of the transmitter portions of the plurality of conversations executing in the first slot; and repeating the steps selecting, scheduling, marking, assigning, and determining until there is no conflict of executing conversations in the first slot.

14. The method of scheduling according to claim 10 wherein the step of resolving any conflict between said designated receiver adapter card and any other conversation by swapping conversations between said first slot and said third slot comprises the step of:

scheduling a conflicting conversation pair out of the free channel and into the third slot.

15. The method of scheduling according to claim 14 wherein the step of scheduling the conflicting conversation into the third slot comprises the steps of:

searching in the third slot for a third slot conversation to move out of the third slot and into the first slot; and scheduling the third slot conversation in a channel vacated by the conflicting conversation in the first slot.

16. The method of scheduling according to claim 15 wherein the step of searching in the third slot for the third slot conversation comprises the steps of:

selecting a conversation in the third slot which has not been marked as previously moved such that the transmitter portion of the selected conversation does conflict with any of the transmitter portions of the plurality of conversations executing in the first slot;

scheduling the selected unmarked conversation in the first slot;

marking the selected unmarked conversation as having been moved;

assigning the vacant channel of the selected conversation to the third slot conversation;

determining whether a receiver portion of the selected conversation conflicts with any of the receiver portions of the plurality of conversations executing in the first slot; and repeating the steps selecting, scheduling, marking, assigning, and determining until there is no conflict of executing conversations in the first slot.

* * * * *